UNITED STATES PATENT OFFICE.

CARL H. O. RADDE, OF HAMBURG, GERMANY.

IMPROVEMENT IN COMPOSITION PATTERNS FOR TAKING MULTIPLE IMPRESSIONS.

Specification forming part of Letters Patent No. 186,163, dated January 9, 1877; application filed August 7, 1876.

*To all whom it may concern:*

Be it known that I, CARL HEINRICH OTTO RADDE, of Hamburg, in the Empire of Germany, merchant, have invented a new and useful Improved Composition for Printing in Colors upon Paper or other Fabric or Material, which improvements are fully set forth in the following specification:

The object of my invention of an improved composition is to facilitate the reproduction in quantity of copies of pictures or representations in varieties of colors, shades, or tints, when such colors have been mixed with such composition as hereinafter described, so as to enable such combined colors and composition to be cut or molded to desired forms, in order to such forms being composed into relation one to another in a suitable frame or holder, so as, when so combined, to form on their surface a picture or representation of which, by the aid of a suitable press and appliances, copies may be readily obtained upon paper or other suitable fabric or material prepared to receive such impressions. The coloring matter I find to answer the purpose is that prepared as follows:

I take mutton-fat from near the kidneys and free from skin, and obtain, by heat, the oily portion thereof—say thirty pounds—and add thereto, say, fifteen pounds white bleached bees-wax, thirty pounds Venetian turpentine, seven and one-half pounds bleached linseed-oil, and seven and one-half pounds bleached poppy-oil.

I heat the two first-named ingredients together to the melting-point; then I heat the three latter ingredients separately, so as to combine them well together, and then I mix them gradually all together and heat to about 90° Celsius.

The pot or kettle in which this is done should have high walls or sides, and when the above mixture is complete, I add to it, say, one and a half pound of a solution of caustic alkali in water. For the purpose of preparing this solution the operator takes, say, twenty-five pounds of solid caustic lye or hydrate of soda, and pours over it sixty pounds of water, and after leaving it to dissolve for forty-eight hours, then the desired quantity of this solution may be employed. Caution and continued stirring of the mixture are necessary. A milky liquid, covered with foam or froth, will be the result, and this I boil, while being continually stirred, until it becomes of a thinnish liquid consistency, similar to hot oil, and of about 110° Celsius heat. A handful of clean salt (chloride of sodium) is added, and after stirring the mixture once more it is let out by a cock or tap in the bottom of the boiler.

I allow the mixture to run into flat pots or pans, and, when cool, I turn them over, and the bottom part, which contains the impurities caused to settle down by the salt, is taken away with a knife. The cleared portion of this mass is the material which I add to the required colors, which may be of the ordinary character; but the effects produced are better in proportion to the purity of the coloring matter employed. After the coloring matters have been reduced to a powdered state, I mix them with the above composition, in proportion, by weight, of which the following are samples—that is to say: Cinnabar, (vermillion,) say, two hundred and twenty-four parts, added to, say, two hundred and fifty parts of composition described; or, carmine, (violet,) forty-eight parts, added to one hundred and fifty-six parts of the above composition; or, carmine, (red) forty-eight parts, added to one hundred and fifty-six parts of the above composition; or, black, five hundred parts, added to twelve hundred parts of the above composition; or, chrome-yellow, (dark,) four hundred and fifty parts, added to eight hundred and twenty parts of the above composition; or, chrome-yellow, (light,) four hundred and fifty parts added to eight hundred and twenty parts of the above composition; or, madder carmine, two hundred and fifty parts, added to seven hundred and fifty parts of the composition; or, ultramarine, two hundred and fifty parts added to five hundred and twenty parts of the composition; or, emerald-green, two hundred and fifty parts, added to five hundred and twenty parts of the composition; or, white, *(blanc d' argent,)* five hundred and twenty-four parts, added to three hundred and eighty parts of the composition.

I do not, however, limit myself to these proportions, as they may be varied to circumstances and the judgment of the operator.

To produce the desired combination of the coloring matters with the above composition, the desired coloring matter is, in a powdered state, placed in a pan or kettle, and the required portion of the mass referred to, heated to a melting-point, is poured over such color. Continued slow stirring and turning about are necessary, so that an even and well-combined mixture may be obtained.

This coloring matter, when cool, is placed in a mill, say between granite or other suitable rollers, and finely ground.

The temperature of the apartment in which these operations are conducted should be maintained at about a uniform state, and a temperature of from 12° to 15° Reaumur is found to answer well.

The combination being completed, the improved composition, colored as desired, is, when heated to a semi-fluid condition, ready to be molded or formed into the desired forms, so that each colored portion may be combined with other portions of other colors or shades, in order to obtain printed impressions from the surface thereof on suitably-prepared materials. In some cases the combined composition and coloring matter is, when solidified by cold, cut to the required forms.

Having thus described my invention, and the manner of carrying the same into practical effect, I would have it understood that what I claim is—

The composition described, consisting of mutton-fat, bees-wax, Venetian turpentine, linseed-oil, and poppy-oil, in substantially the proportions above named, and for the purpose set forth.

In testimony whereof I, CARL HEINRICH OTTO RADDE, have signed my name to this specification in the presence of two subscribing witnesses.

CARL HEINRICH OTTO RADDE.

Witnesses:
  GEORG ULRICH,
  MARTIN LEVY.